Nov. 7, 1933.                    C. A. WRIGHT                    1,934,023
PROCESS FOR OBTAINING VALUABLE PRODUCTS FROM COAL AND OTHER CARBONACEOUS
         MATERIALS AND IMPROVED APPARATUS FOR SUCH A PROCESS
                    Filed May 15, 1930              2 Sheets-Sheet 1
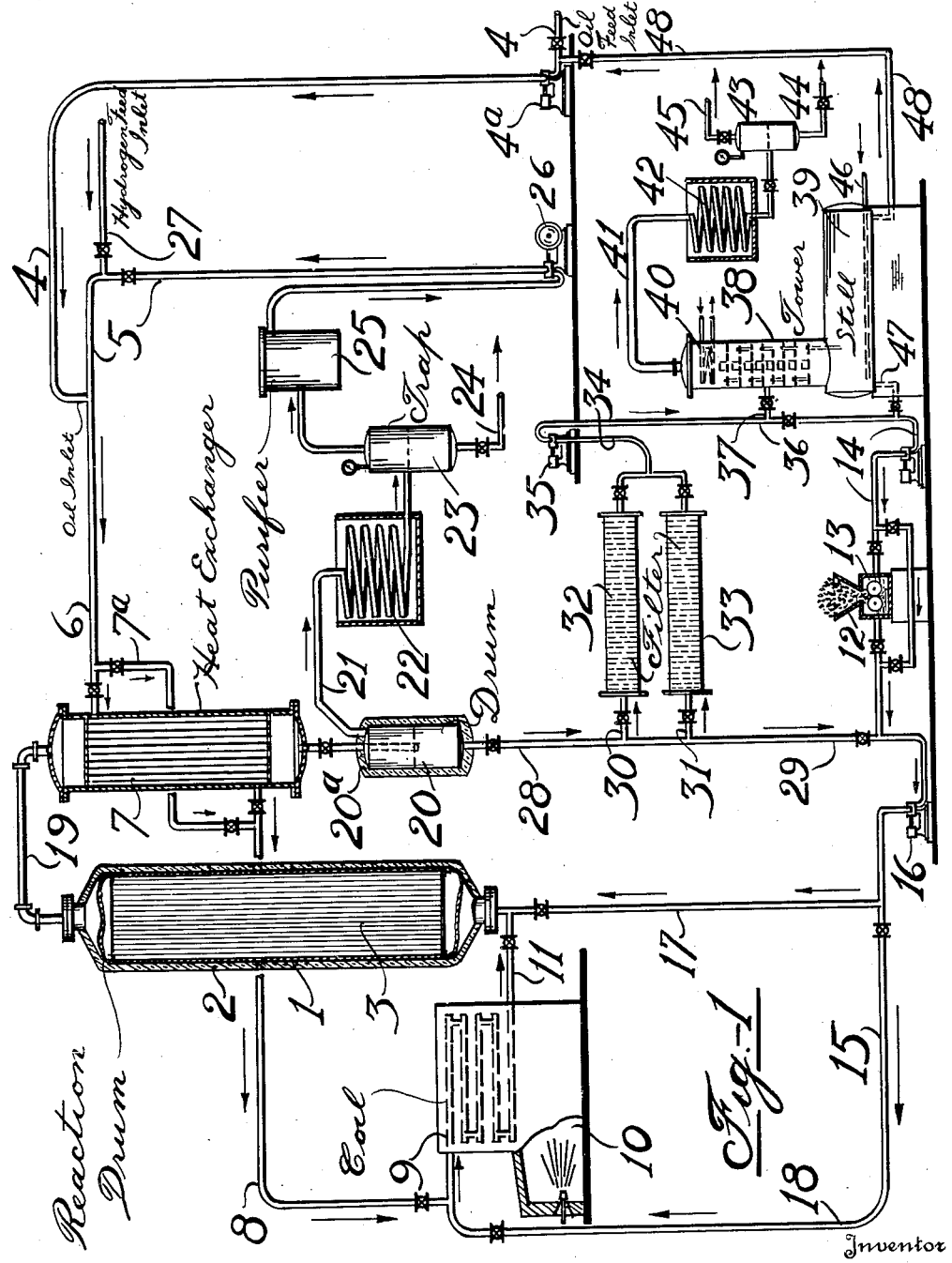
Inventor
Clarence A. Wright
By
W. E. Currie  Attorney

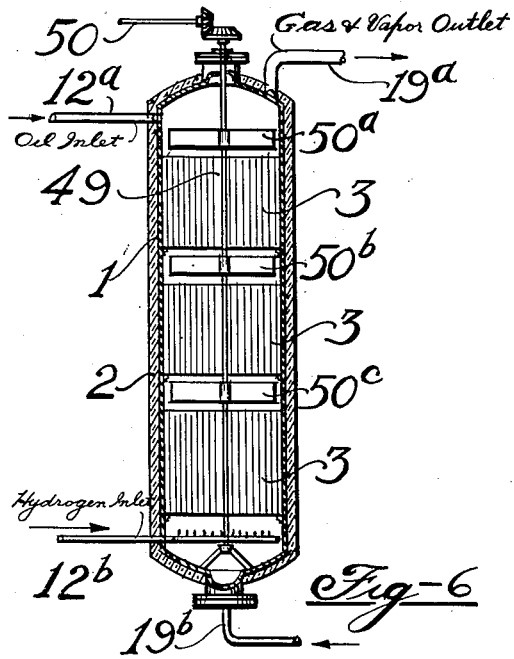
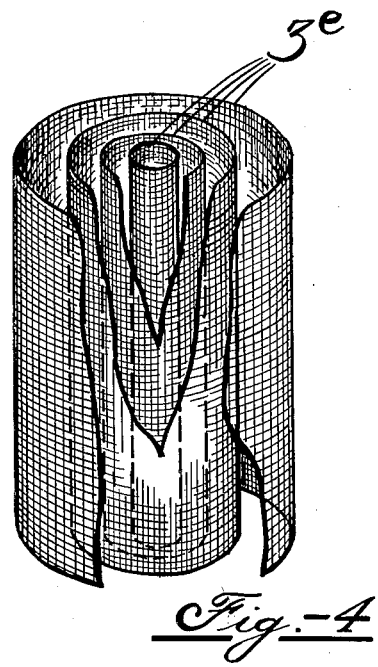
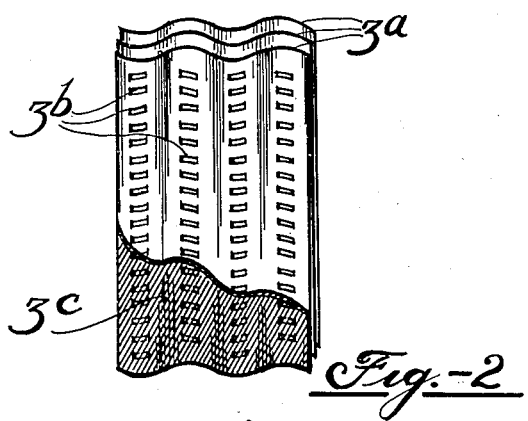
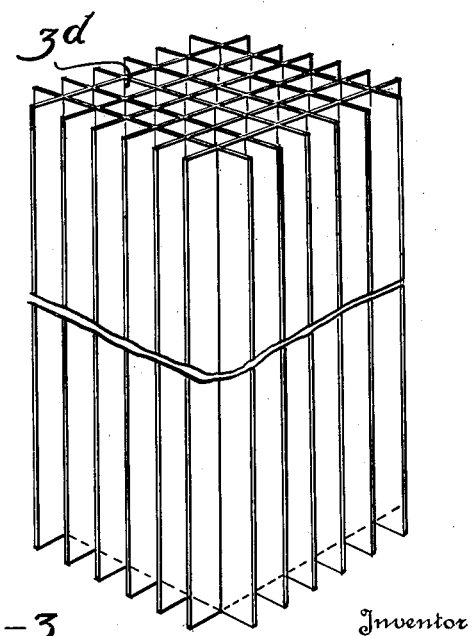
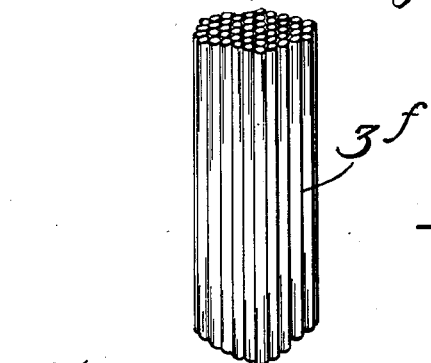

Patented Nov. 7, 1933

1,934,023

UNITED STATES PATENT OFFICE 1,934,023

PROCESS FOR OBTAINING VALUABLE PRODUCTS FROM COAL AND OTHER CARBONACEOUS MATERIALS AND IMPROVED APPARATUS FOR SUCH A PROCESS

Clarence A. Wright, Elizabeth, N. J., assignor to Standard-I. G. Company

Application May 15, 1930. Serial No. 452,631

10 Claims. (Cl. 196—53)

The present invention relates to an improved process and apparatus for the hydrogenation of carbonaceous materials, such as coal tar, petroleum and other materials, but particularly coal. The invention also relates to an improved apparatus for carrying out such hydrogenation. My invention will be fully understood from the following description and the drawings which illustrate my process and the apparatus for carrying it out.

In the drawings, Figure 1 is a sectional view of an apparatus shown in semi-diagrammatic form illustrating a suitable apparatus for carrying out my improved hydrogenation process and indicates the flow of materials through the process.

Figure 2 shows an alternate means of packing the reactor employed in my apparatus and illustrated in Figure 1.

Figures 3–5 and 6 show other packing means for accomplishing the same results.

It is well known that coal and other materials may be hydrogenated at elevated temperatures and under high pressure, with and without the aid of catalytic materials in finely divided condition. In a co-pending application an improved method for carrying out the hydrogenation of coal and other solid carbonaceous materials, particularly those containing ash or other inert or difficultly hydrogenated solid materials, is disclosed in which solid lump catalyst is used in the reaction zone and the coal-oil suspension is pumped therethrough.

The present invention is an improvement over the above noted process and is particularly applicable to the hydrogenation of carbonaceous materials containing inert solids or difficultly hydrogenated materials, and enables one to operate the process for long periods of time without accumulation of inert materials in the reaction drum. My invention will be understood from the following description.

Referring to the drawings in Figure 1 reference character 1 designates a high pressure reaction vessel, preferably mounted vertically and protected from excessive loss of heat by an insulating cover 2. The reaction vessel is adapted to withstand high temperatures and pressures, for example temperatures in excess of 750 or 850° F. or higher, as well as pressures of 100 or 200 atmospheres or more, and the corrosive effects of the reactants at such temperatures and pressures. The reaction drum is provided with suitable catalytic material 3, arranged on vertical surfaces, preferably extending the length of the reaction chamber and leaving a substantially unobstructed vertical passage therethrough. In Figure 1 flat plates 3 are shown which may be hung from any suitable suspension means at the top of the reactor and which are preferably spaced at the top and bottom and preferably at intermediate points so as to maintain a substantially constant space between adjacent plates. This space may be ¼ to ½ or even 1". It will be understood that the closer the plates are placed together the more effective the catalyst becomes. The plates themselves may be of metal, either perfectly flat or corrugated, as will be understood.

Oil is supplied through a line 4 and a pump 4a and is forced into a line 6 where it is mixed with high pressure hydrogen supplied through a line 5. Pipe 6 is connected to a heat exchanger 7 for preheating the mixture of gas and oil and a suitable by-pass line 7a is provided to regulate the flow through the exchanger. Pipe 8 conducts the preheated oil from the exchanger to a fired coil 9 arranged in a suitable setting 10, and discharges through a line 11 into the bottom of reactor 1.

Coal is added by a hopper 12 to a grinding mill 13 and oil is added thereto by means of a line 14 from a suitable source which will be described below. The oil in passing through the mill 13 picks up finely ground coal in a suspension and the latter may be forced by a pump 16 through lines 15 and 17 directly into the base of reaction chamber 1. If desired, the oil coal mixture may be preheated, by any suitable heat exchange means (not shown) and may be passed by line 18 through coil 9 and 10 as indicated. It is preferable to force the oil and coal mixture directly into the reactor and to force an independent stream through the coil 9 and then into the reactor as indicated.

In passing through the reactor 1 the oil coal mixture flows upwardly through the unconstricted space between the plates 3 and finds outlet from the upper end of the reactor by a line 19 which is in communication with exchanger 7. The mixture is then discharged into a separation drum 20 which may be maintained at a suitable elevated temperature by insulation 20a, and it will be understood that heating means may be supplied if desired. Gaseous and vaporous materials are removed from the separator by line 21 to a condenser 22 in which the balance of the normally liquid materials are condensed and the mixture of gas and liquid is discharged into the trap 23 from which liquid is removed by line 24. The gas still under high pressure is taken from the top of the trap 23 to a purifier 25 which may be of any suitable design capable of removing hydrogen sulfide and hydrocarbons from the hydrogen. Purified gas is then recompressed by booster pump 26 and returned to the hydrogen feed line 5 which is also supplied from an external source by a line 27.

Liquid material or rather liquid containing certain solids in suspension is removed from drum 20 and may be returned directly by lines 28 and 29 to line 15 and pump 16 for a further passage through the reaction drum. On the other hand a part or all of the withdrawn oil may be passed by line 28 and either of the lines 30 or 31 through suitable filters 32 and 33 respectively. These filters may be of any suitable construction and although plate and frame presses are indicated on the diagrammatic sketch, it will be understood that continuous filters or even centrifugal separating devices well known in the art may be used. Clear oil free of suspended matter is withdrawn from the filters by line 34 and is forced by pump 35 either back to line 14 directly by way of pipe 36 or a part of the oil may be withdrawn by a valve line 37 and discharged into a tower 38, which is surmounted on a still 39. The tower may be fitted with any suitable rectifying means such as bubble cap plates or the like and cooling coil 40 is preferably placed in the upper part of the tower 38. Vapor is withdrawn by the vapor line 41 to condenser 42 and trap 43. Condensate may be withdrawn by line 44 and gas by a pipe 45.

Still 39 may be heated in any preferred manner, for example, by a closed steam coil or by injection of steam by means of the line 46. Part or all of the oil may be withdrawn from the still by a line 47 and returned by line 14 to the grinding mechanism 13 for conducting a fresh supply of coal into the reaction chamber as indicated above. On the other hand a part of the oil may be withdrawn from the still 39 by a line 48 and may be forced through this line into a feed line 4 as indicated above.

As indicated in the above description the plates 3 in the reaction chamber 1 may be flat plates vertically placed in substantially parallel planes, but the catalyst may be disposed in any other suitable manner. For example, Figure 2 shows a very satisfactory manner of obtaining contact of the catalyst with the oil. Numerals 3a indicate the plates which are constructed of corrugated metal such as iron or steel. These plates are preferably punched with holes 3b and the catalyst material 3c may be spread on the metal plates in the form of a thick paste and allowed to dry. The paste adheres closely to the metal wall in much the same manner as plaster is placed on laths. If desired, plates may be made of expanded metal, as will be understood. The plates may also be of constructed metal wire screen and the metal itself may be possessed of catalytic properties or it may be inert in which case the catalyst will be applied as indicated above as a thick paste covering the plates or filling spaces or meshes and allowed to dry.

The plates may be placed entirely in parallel planes, but as shown in Figure 3 the plates 3d may be placed in intersecting planes so as to form a honeycomb-like structure, which leaves substantially unobstructed upward passages.

Figure 4 indicates another suitable means for placing the catalyst in the oven. The plates 3e may be rolled into cylinders and placed concentrically with the reactor and with each other and arranged so as to leave a suitable space of ¼", ½", 1" or more between the various plates. In this case wire screen is particularly desirable.

In Figure 5 another type of oven packing is indicated which is particularly desirable where metal possessing catalytic properties is used. In this case tubes 3f either made entirely of the active metal or plated or coated therewith are placed vertically within the reactor 1 producing a honeycomb-like structure similar to that shown in Figure 3, except for the circular cross section.

In Figure 6 somewhat different arrangement of the reaction chamber is shown. The reactor 1' is fitted with a stirring mechanism 50 with paddles 50a—50b and 50c at different levels throughout the reactor and in the space between the paddles the plates 3 are arranged. The reactor in Figure 6 may be operated in exactly the same manner as the reactor in Figure 1 or if desired the oil and coal mixture may be introduced at the top through pipe 12a and hydrogen may be introduced at the bottom through pipe 12b. In this case gas and vapor will be withdrawn from the top of the reactor by vapor line 19a and the fluid mixture of oil and solid material will be removed from the bottom of the reactor by pipe 19b. This arrangement makes somewhat different separation equipment necessary, but it is believed that the hookup will be clearly understood by those skilled in the art.

In the operation of my process oil alone or oil and coal in the form of a suspension is forced through the reactor in which catalyst is placed on plane surfaces arranged to allow an unobstructed upward or downward flow. The plates are arranged closely and the reactor is of sufficient height to cause a substantial reaction during the passage of the oil-coal mixture therethrough. It has been found desirable to leave a space of not more than 2" between the plates, but as will be understood the distances may be somewhat varied with the activity of the catalyst used and the nature of the particular material being hydrogenated, some materials being more susceptible to the treatment than others. The reactor itself is preferably unheated and if the materials themselves are raised to a temperature of about 700 or 750° F. before entering the reactor 1, a temperature of 800 to 850° F. or above may be maintained within the reactor due to the heat evolved by the reaction, but in such case it is desirable to protect the reactor from excessive loss of heat by insulation or equivalent means.

The coal should be ground finer than about 50 mesh and preferably finer than 100 or even 200 mesh and the oil is preferably a product of a prior hydrogenation of coal. I also wish to include grinding to a degree capable of producing a substantially colloidal suspension. Although the oil-coal mixture may be heated in a coil 9, if care is taken in the operation and the temperature is not raised too high, it is preferred to pass the coal and oil directly into the drum not preheating over 300 or 400° F. and to pass a part of the oil alone through the preheated coil wherein it is heated to temperatures ranging from 750° to 850° F. and thereby carrying sufficient heat into the reactor to raise the temperature of the entire feed to 700 or 800° F. at which temperatures the reaction is sufficiently vigorous to proceed. Ordinarily the coal comprises 20 to 60% of the weight of the mixture depending on the character of the oil and the fineness of the grinding. It will be understood that in general for oils of lower specific gravity it is preferable to grind finer and in general by finer grinding the proportion of coal to oil may be increased; at the same time it is desirable to keep the mixture sufficiently fluid so that it may be readily pumped. The mass is fed at a rate of from 0.25 to 1.5 volumes of the suspension per volume of reactor space per hour, and it will be understood that for more active catalysts shorter time may be required, but if oil without coal is used the feed rate may be increased considerably. Also time is ordinarily decreased inversely with the temperature at which the oven is maintained. The velocity of flow is sufficiently high to prevent settling of coal particles, when an upward flow is maintained and it has been found that a rate of about 200 feet per hour with material completely passing 200 mesh and 30% passing 325 is satisfactory. As will be understood with finer or colloidal materials the flow may be slower. The volume of hydrogen circulated is largely in excess of that required for reaction and it has been found satisfactory to circulate from about 10,000 to 30,000 cubic feet per barrel of oil-coal mixture fed. Pressure should be in excess of 20 atmospheres but ordinarily pressures in excess of 100 or 200 atmospheres or higher are desirable.

Where the catalysts are sufficiently active, the feed rate may be adjusted to effect a substantially complete liquefaction of the carbonaceous portions of the coal in a single passage through the reactor, together with a substantial conversion of such portion into light oils similar to gasoline and kerosene. The effluent mixture from the reactor comprising vapors and liquids is removed, cooled and discharged into a separation chamber. Separation chamber may be held at any desired temperature, but it is preferable to maintain it at such a temperature as to allow the gas and lighter oils, say boiling up to 400 or 500° F. to pass overhead. The lighter normally liquid hydrocarbons are then removed from the gases by further cooling and the gases are purified, for example by scrubbing oil under high pressure, and returned to the reaction chamber.

The heavy oil from the trap 20 contains suspended ash and difficultly hydrogenated materials and a part of this may be returned directly to the reactor in order to obtain a larger yield of low boiling hydrocarbons. Alternately a part of the oil may be filtered or centrifuged to remove solid materials and may be subsequently returned to the reactor. If desired, the oil after being freed from solid materials may be distilled so as to remove a middle oil, for example boiling up to 600 or 650° F. This product is an excellent cracking stock and may be separately cracked or hydrogenated or sold as a carbureting gas oil. The heavier fractions of the oil are preferably returned to the reaction vessel carrying in a fresh supply of coal.

As will be understood oil must be used to put this process in operation, but after it has begun to operate successfully fresh oil need not be added since sufficient oil is produced from the coal to carry in the solid materials. At the same time a combination process in which fresh oil and fresh coal are continuously fed to the apparatus is contemplated.

As indicated in the description above it is of importance to arrange the catalytic plates within the reactor so as to provide an unobstructed upward and downward passage. The plates themselves may be of catalytic metals, for example mixtures of any two of the following metals, silver, copper, cadmium, lead, bismuth and tin, for example; mixtures of copper and zinc, or silver and chromium, with or without other catalytic metals, especially iron or other metals of the iron group are desirable. On the other hand I prefer to make the catalyst bearing surfaces of steel plate or of wire and to cover the metal with an active catalytic agent, for example; oxides of molybdenum, chromium or tungsten or mixtures of these oxides with other oxides such as magnesium oxide, zinc oxide, aluminum oxide and the like. Sulfides of the metals in the sixth group are satisfactory. All of these materials are characterized by satisfactory hydrogenating properties and by ability to withstand poisonous action of sulfur.

By the operation of my process the solid residue may be obtained substantially free from solid combustible materials, although it may be economically desirable to withdraw a residue which contains 10% or more of unreacted coal. When the combustible constituents are sufficiently high the material may be burned around the refinery or elsewhere as a source of power.

My process may be operated as indicated above to produce a maximum quantity of light oil suitable for motor fuels, but I prefer to operate at such temperature and time of contact to liquefy the coal with a somewhat smaller production of naphtha and a substantial yield of middle oil which may be cracked or hydrogenated in subsequent operations, either in liquid or vapor phase.

My invention is not to be limited by any theory of the mechanism of the reactions, nor to any specific example which may have been given for purpose of illustration, but only by the following claims in which I wish to claim all novelty inherent in my invention.

I claim:

1. An improved process for destructive hydrogenation of hydrocarbon materials comprising passing a stream of heavy liquid hydrocarbons and hydrogen upwardly between closely spaced substantially vertical and parallel catalytic surfaces disposed in a reaction zone, permitting substantially unobstructed flow therethrough, maintaining the reaction zone at a temperature in excess of about 750° F. and under pressure in excess of 20 atmospheres.

2. Process for the destructive hydrogenation of solid carbonaceous materials comprising reducing the same to a fine state of subdivision suspending it in an oily vehicle and passing said suspension with added hydrogen upwardly between closely spaced substantially vertical and parallel catalytic surfaces disposed in a reaction zone permitting substantially unobstructed flow therethrough and maintaining said reaction zone at a temperature above about 750° F. and at a pressure in excess of 20 atmospheres.

3. An improved reaction chamber for hydrogenation of heavy hydrocarbons and fitted with closely spaced substantially vertical and parallel catalytic surfaces arranged therein to form a plurality of substantially unobstructed passageways from end to end.

4. Apparatus according to claim 3 in which the catalytic surfaces comprise a plurality of metallic plates not more than 2 inches apart, coated with active catalytic agent and arranged in a honeycomb-like structure to form a plurality of substantially unobstructed vertical passageways.

5. An improved process for the hydrogenation of fluent hydrocarbon materials such as oils containing materials showing a tendency to precipitate within the reaction chamber which comprises passing said fluent materials with added hydrogen upwardly between closely spaced substantially vertical and parallel catalytic surfaces disposed in a reaction zone permitting substantially unobstructed flow therethrough while maintaining said reaction zone at a reaction temperature and pressure.

6. Process according to claim 2 in which the upward velocity is above about 200 feet per hour and sufficient to prevent any substantial settling of the solids.

7. Process according to claim 2 in which the oily suspension is passed through the catalytic zone with hydrogen at a rate of from .25 to 1.50 volumes per hour per volume of reactor space, withdrawn and separated into gaseous and liquid portions.

8. Process according to claim 2 in which the suspension is forced between the catalytic surfaces and a stream is withdrawn therefrom, solid material is separated therefrom and the heavier liquid portions are returned with fresh carbonaceous material.

9. Process according to claim 2 in which the time of contact is sufficient to cause liquefaction of the major quantity of the solid combustible material.

10. Apparatus according to claim 3 in which the catalyst is arranged on vertically disposed plates comprising metallic screens.

CLARENCE A. WRIGHT.